(12) United States Patent
Moran

(10) Patent No.: US 6,694,665 B1
(45) Date of Patent: Feb. 24, 2004

(54) ILLUMINATABLE FISHING LINE SYSTEM

(76) Inventor: Michael J. Moran, 486 N. Lake Dr., Watertown, SD (US) 57201

( * ) Notice: Subject to any disclaimer, the term of this patent is extended or adjusted under 35 U.S.C. 154(b) by 0 days.

(21) Appl. No.: 10/223,028

(22) Filed: Aug. 16, 2002

(51) Int. Cl.[7] .............................................. A01K 91/00
(52) U.S. Cl. ..................................... 43/17.5; 43/44.98
(58) Field of Search ............................. 43/17.5, 44.98, 43/4; 362/577, 582, 583, 551, 554, 556; 385/146, 147, 901, 115, 120; 428/374

(56) References Cited

U.S. PATENT DOCUMENTS

| | | | | | |
|---|---|---|---|---|---|
| 4,501,084 A | * | 2/1985 | Mori | ............................ | 43/17.5 |
| 4,505,063 A | * | 3/1985 | Price et al. | ................... | 43/17.5 |
| 4,556,930 A | * | 12/1985 | Mori | ............................ | 43/17.5 |
| 4,617,751 A | * | 10/1986 | Johansson | .................... | 43/17.5 |
| 5,063,700 A | * | 11/1991 | Kiefer et al. | ................. | 43/17.5 |
| 5,184,882 A | * | 2/1993 | Davenport et al. | .......... | 362/554 |
| 5,333,228 A | * | 7/1994 | Kingstone | .................... | 385/901 |
| 5,414,951 A | * | 5/1995 | Martin | ......................... | 43/17.5 |
| 5,546,695 A | * | 8/1996 | Langer | ....................... | 43/44.98 |
| 5,617,496 A | * | 4/1997 | Kingstone | .................... | 385/901 |
| 5,617,497 A | * | 4/1997 | Kingstone | .................... | 385/901 |
| 5,669,692 A | * | 9/1997 | Thorgersen et al. | ......... | 362/556 |
| 5,718,666 A | * | 2/1998 | Alarcon | ....................... | 362/551 |
| 5,782,033 A | * | 7/1998 | Park et al. | ......................... | 43/4 |
| 6,074,071 A | * | 6/2000 | Baumberg et al. | ........... | 362/582 |
| 6,160,940 A | * | 12/2000 | Summers et al. | ............. | 385/147 |
| 6,173,609 B1 | * | 1/2001 | Modlin et al. | ............... | 385/115 |
| 6,207,077 B1 | * | 3/2001 | Burnell-Jones | ......... | 252/301.36 |
| 6,217,204 B1 | * | 4/2001 | Arima | .......................... | 362/551 |
| 6,264,855 B1 | * | 7/2001 | Kitagawa et al. | ...... | 252/301.4 R |
| 6,393,192 B1 | * | 5/2002 | Koren | .......................... | 385/147 |
| 6,493,492 B1 | * | 12/2002 | Fischer | ......................... | 385/115 |
| 6,606,431 B2 | * | 8/2003 | Unsworth | ..................... | 385/147 |
| 6,612,729 B1 | * | 9/2003 | Hoffman | ...................... | 362/582 |

FOREIGN PATENT DOCUMENTS

| | | | | |
|---|---|---|---|---|
| FR | 2590115 B1 | * | 5/1987 | |
| GB | 2161051 B1 | * | 1/1986 | ................. 43/17.5 |
| JP | 2001-224279 B1 | * | 8/2001 | |
| JP | 2001-224294 B1 | * | 8/2001 | |
| WO | WO-88/09120 B1 | * | 12/1988 | |

\* cited by examiner

Primary Examiner—Darren W. Ark

(57) ABSTRACT

A illuminatable fishing line system for enhancing visibility of the fishing line during low light or night-time hours. The illuminatable fishing line system includes comprises a line member having a core portion providing tensile strength, an outer portion providing abrasion and moisture protection, and an intermediate portion. The intermediate portion facilitates illumination of the line member during night-time and low-light usage.

5 Claims, 9 Drawing Sheets

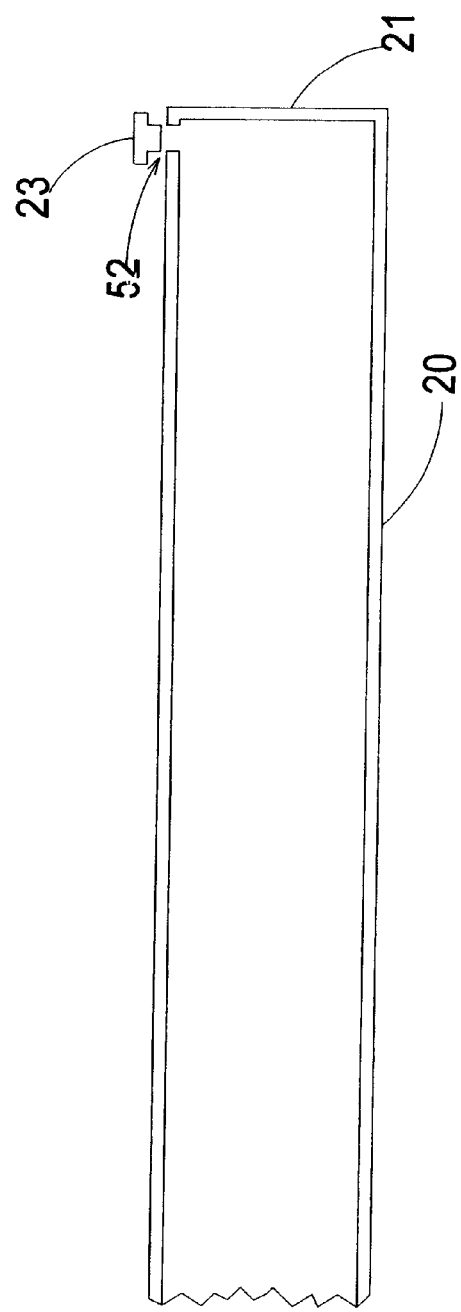
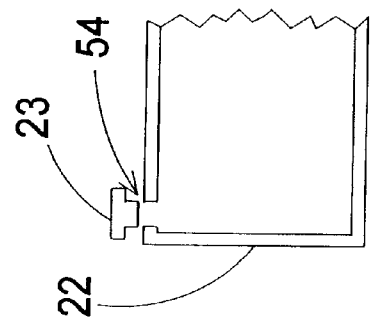
Fig. 7

ILLUMINATABLE FISHING LINE SYSTEM

BACKGROUND OF THE INVENTION

1. Field of the Invention

The present invention relates to fly fishing lines and more particularly pertains to a new illuminatable fishing line system for enhancing visibility of the fishing line during low light or night time hours.

2. Description of the Prior Art

The use of fly fishing lines is known in the prior art as regards various illumination schemes. U.S. Pat. No. 6,264,855 describes a process for preparing water resistant luminous pigments. Another type of illuminating system is U.S. Pat. No. 6,207,077 having a luminescent gel coat and moldable resin. Additionally, U.S. Pat. No. 4,505,063 describes a fishing lure with a chemiluminescent material formed into a cavity of the lure.

While these devices fulfill their respective, particular objectives and requirements, the need remains for a system that is superior in that it provides improved visibility of the line itself during low-light conditions.

SUMMARY OF THE INVENTION

The present invention meets the needs presented above by providing a line which allows the user to see the entire length of line rather than just a lure at the end of the line or portion of the rod.

An object of the present invention is to provide a new illuminatable fishing line system that reduces the demands on muscle memory for facilitating casting in low-light.

Another object of the present invention is to provide a new illuminatable fishing line system that provides improved strike indications by allowing the user to see changes in the flow of the line.

To this end, the present invention generally comprises a line member having a core portion providing tensile strength, and other portion providing abrasion and moisture protection and an intermediate portion between the core and outer portions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a cross sectional view of the present invention in an alternate embodiment using a hollow line member.

DESCRIPTION OF THE PREFERRED EMBODIMENT

Figure 1:
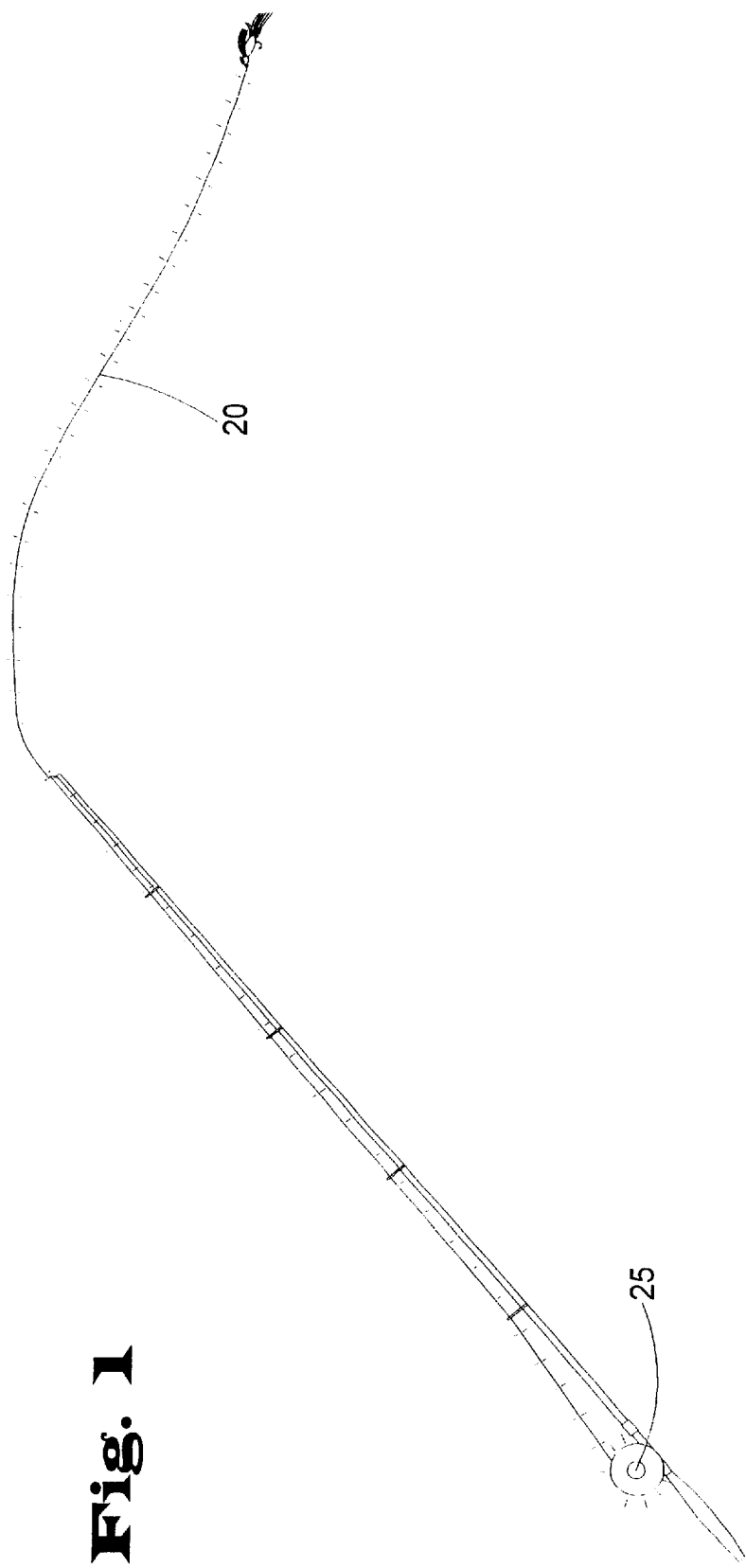
FIG. 1 is a schematic perspective view of a new illuminatable fishing line system according to the present invention in use.
Figure 2:
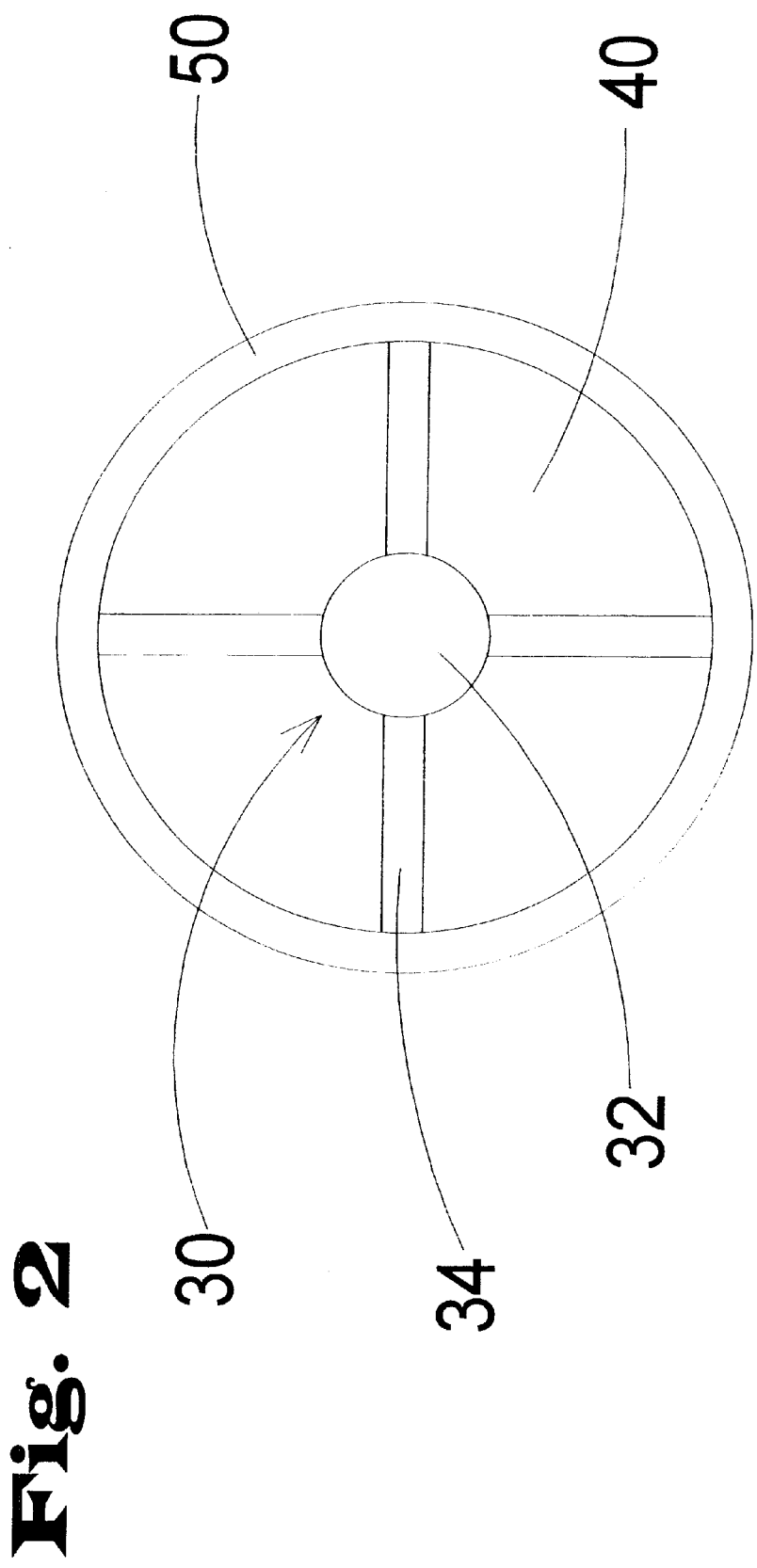
FIG. 2. is a schematic cross-sectional view of the line member of the present invention.
Figure 3:
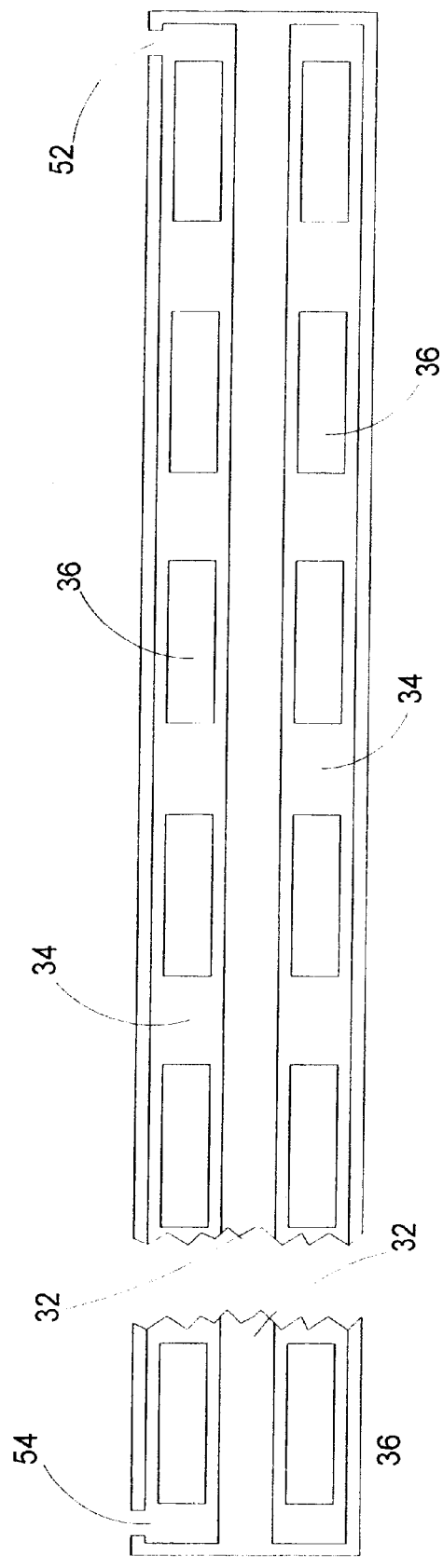
FIG. 3 is a schematic detail view of the core and outer portions of the present invention.
Figure 4:
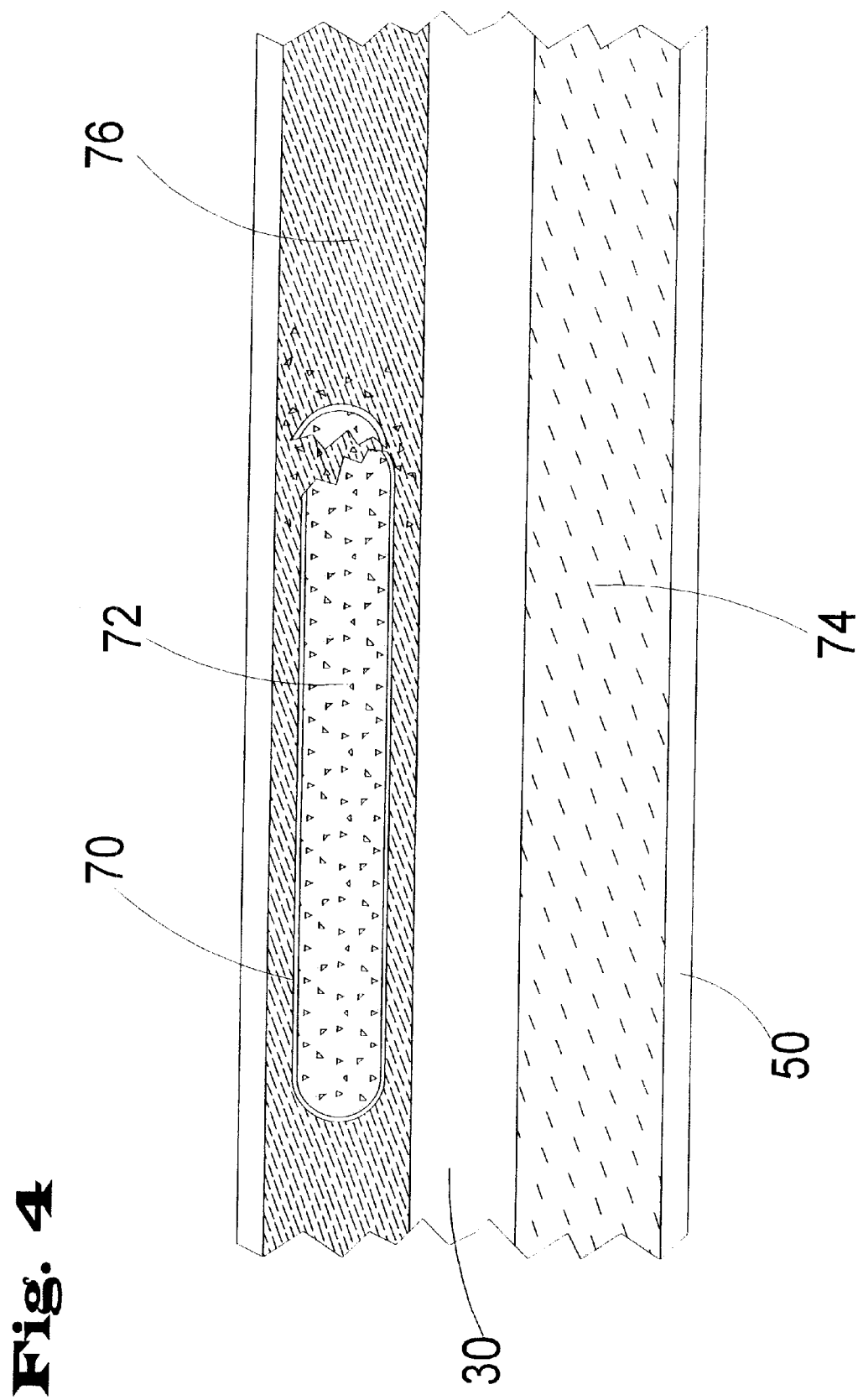
FIG. 4 is a schematic detail view of an alternate embodiment of the present invention.
Figure 5:
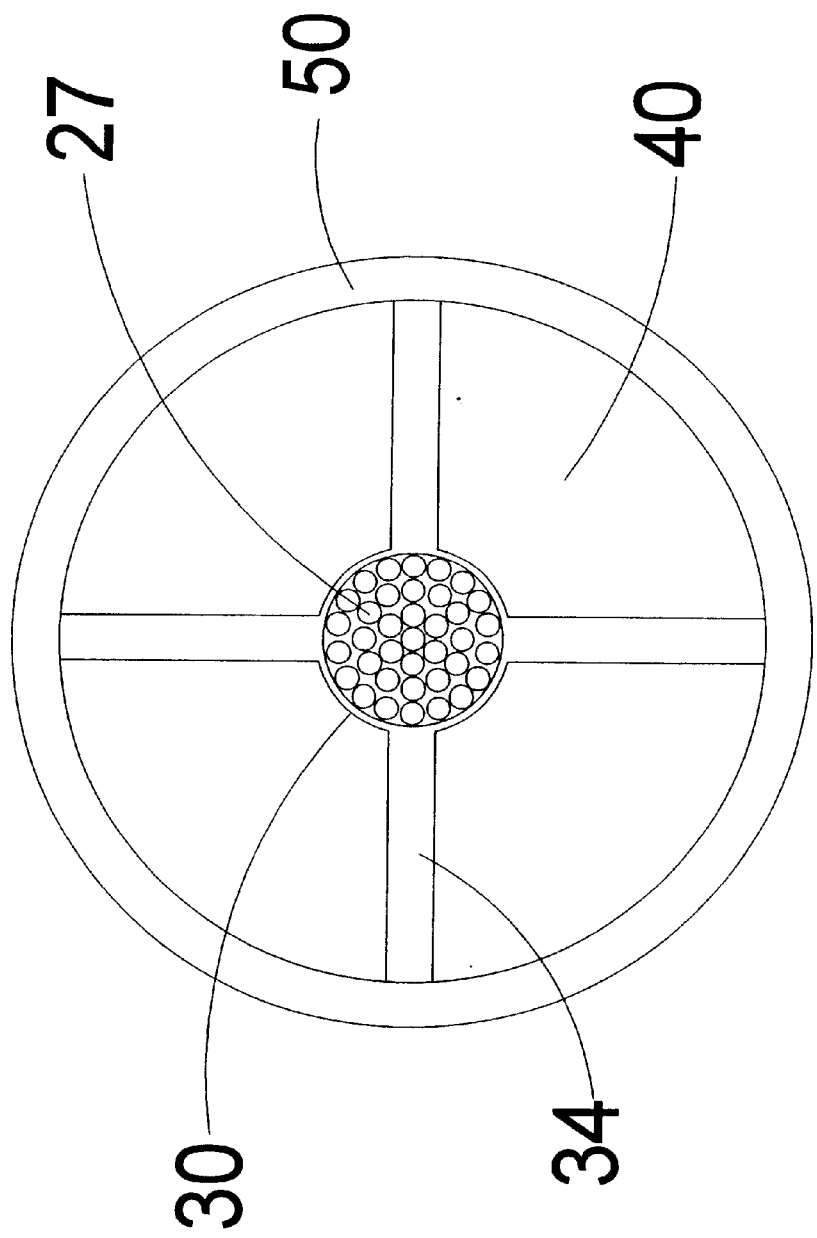
FIG. 5 is a schematic cross-sectional view of the line member in one embodiment of the present invention.
Figure 6:
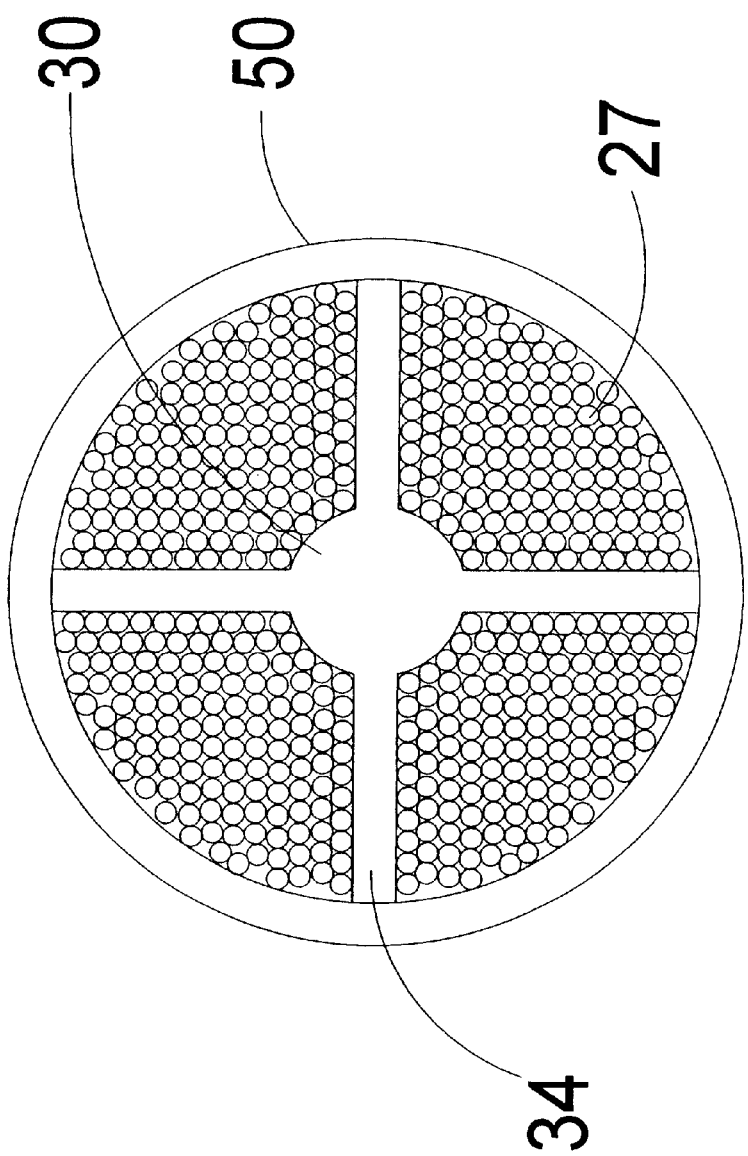
FIG. 6 is a schematic cross-sectional view of the line member in an alternate embodiment of the present invention.
Figure 8:
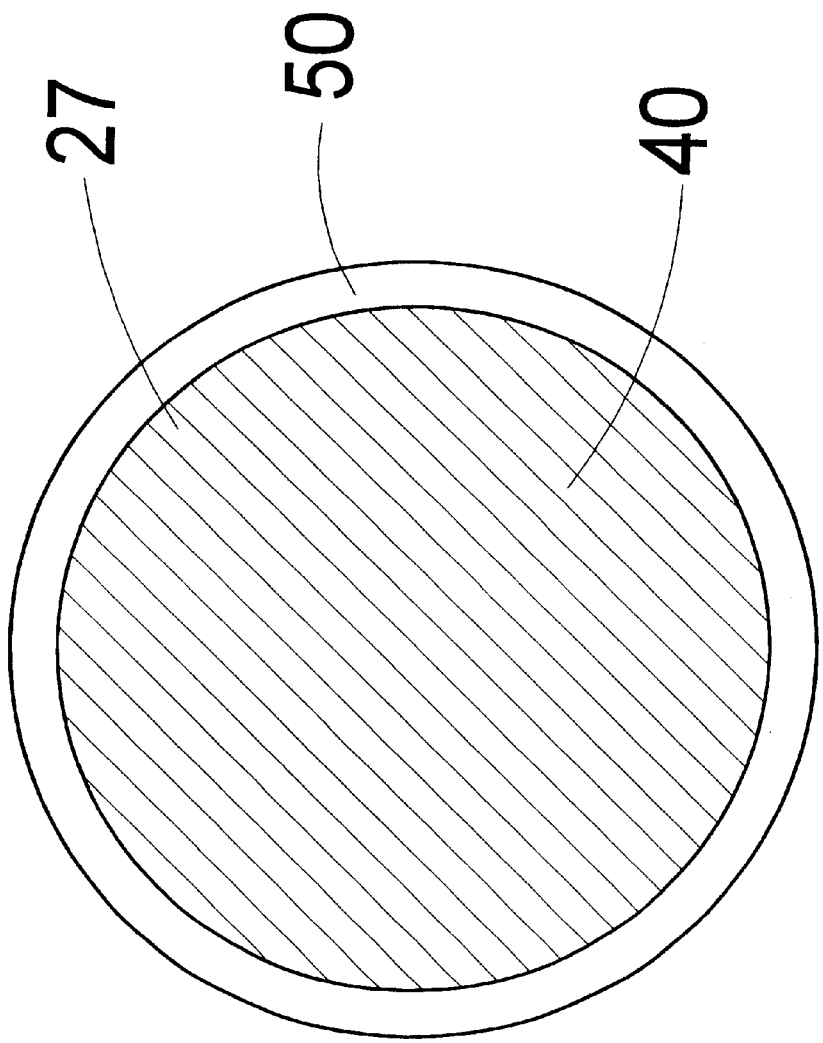
FIG. 8 is a schematic cross-sectional view on an alternate embodiment utilizing a hollow line member and a single fiber optic member.
Figure 9:
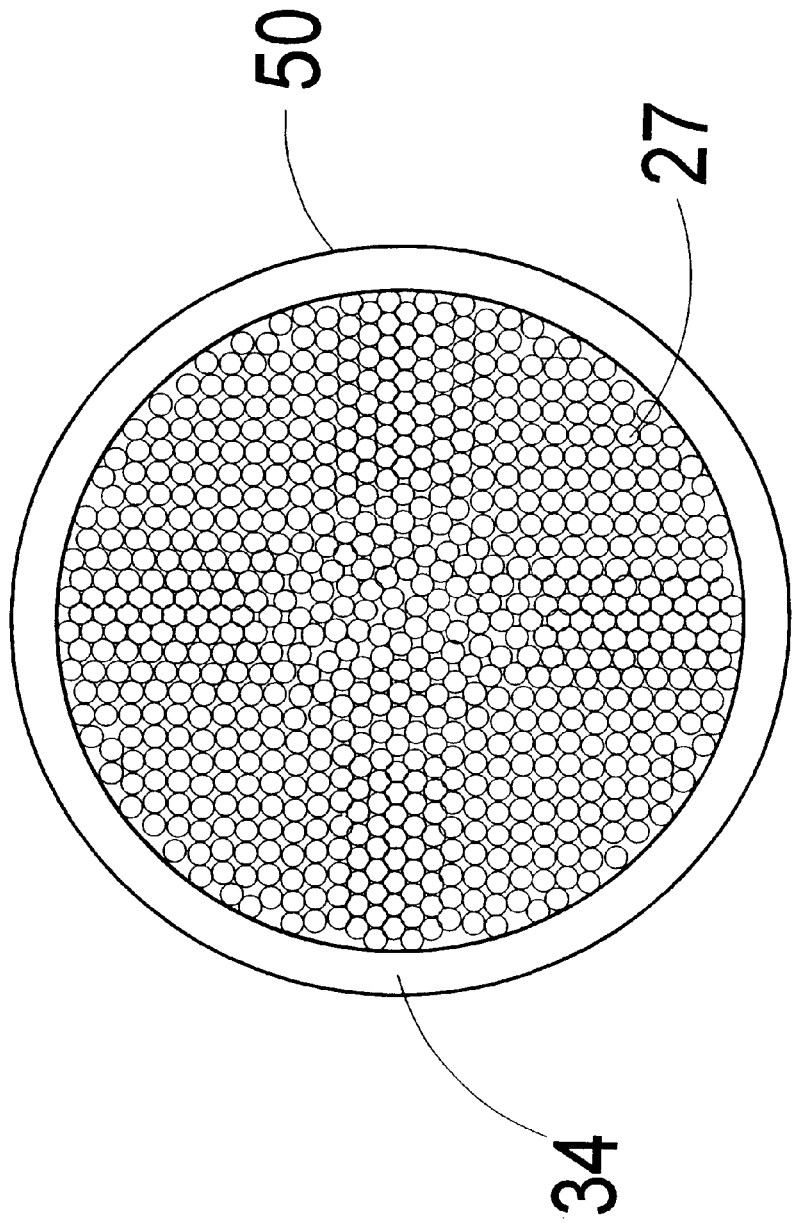
FIG. 9 is a schematic cross-sectional view on an alternate embodiment utilizing a hollow line member and a plurality of fiber optic members.

With reference now to the drawings, and in particular to FIGS. 1 through 9 thereof, a new illuminatable fishing line system embodying the principles and concepts of the present invention and generally designated by the reference numeral 10 will be described.

As best illustrated in FIGS. 1 through 9, the illuminatable fishing line system 10 generally comprises a line member 20 having a core portion 30, an outer portion 50, and an intermediate portion 40.

The line member 20 is elongate and includes a core portion 30 which provides tensile strength for the line member 20. The line member 20 also includes an outer portion 50 which provides protection from abrasion and moisture for the line member 20.

In a preferred embodiment, the core portion 30 includes a substantially cylindrical central part 32. The central part 32 is elongate and extending a length of the line member 20. The core portion 30 also includes a plurality of rib members 34 extending radially from the central part 32 each one of the rib members 34 couple the central part 32 to the outer portion 50.

The line member 20 may also include an intermediate portion 40 positioned along a length of the line member 20 between the core portion 30 and the outer portion 50. The intermediate portion 40 facilitates illumination of the line member 20 during night-time and low-light usage.

In an embodiment each one of the rib members 34 runs along a length of the line member 20. Each one of the rib members 34 may divide the intermediate portion 40 into segments. Each one of the rib members 34 may also include a plurality of apertures 36 extending therethrough to facilitate environmental communication between segments. Preferably the intermediate portion 40 is for receiving an illuminating material.

In a preferred embodiment, the line member 20 includes a first aperture 52 extending through the outer portion 50 for facilitating access to the intermediate portion 40. The first aperture 52 is selectively closable and is positioned at a first end of the line member 20. An illuminating material is positionable in the intermediate portion 40 through the first aperture 52. The illuminating material is preferably a liquid for facilitating flow of the illuminating material through the intermediate portion 40.

In a further embodiment the illuminating material is a chemiluminescent liquid 60 for illuminating the line member 20 when the chemiluminescent liquid 60 is positioned through the intermediate portion 40.

In still a further embodiment, a second aperture 54 also extends through the outer portion 50. The second aperture 54 is positioned at a second end of the line member 20 opposite of the first end of the line member 20. The second aperture 54 is for facilitating insertion and removal of the illuminating material by providing an opening for air to flow into and out of the line member 20 when the illuminating material is being inserted or removed. The second aperture 54 is also selectively closeable.

In one embodiment the core portion 30 is weighted such that the line member 20 sinks at a predetermined sink rate. Preferably the predetermined sink rate is in the range between 1 inch per second and 10 inches per second inclusive. In an alternate embodiment the core portion 30 is designed such that the line member 20 floats upon a surface of water when cast.

In a second prefered embodiment, a capsule member 70 is positioned within the intermediate portion 40 and adjacent to a first end of the line member 20. The capsule member 70 is substantially hollow and is crushable. A first inactive chemiluminescent material positioned within the capsule member 70 and is released from the capsule member 70 when the capsule member 70 is crushed. A second inactive chemiluminescent material 74 is positioned within the intermediate portion 40. The first and second inactive chemiluminescent materials react when the first inactive chemiluminescent material 72 is released from the capsule member 70 such that a third active chemiluminescent material 76 is formed. Thus the line member 20 is illuminated. This embodiment does not require the insertion, removal, or replacement of an activated chemiluminescent material through apertures 36 in the outer portion 50.

In a third preferred embodiment, a light source 25 abuts a first end of the line member 20. The light source 25 provides illumination for the line member 20 and is selected from a group of light sources consisting of an incandescent bulb, a light emitting diode, a laser, and a halogen bulb.

In a further embodiment, the light source 25 is optically coupled to the intermediate portion 40.

In still a further embodiment the intermediate portion 40 is optically lossy such that refraction directs light from the light source 25 to the outer portion 50 through the intermediate portion 40 along a length of the line member 20.

In yet a further embodiment, the system further comprising a plurality of optical fibers 27 positioned within the intermediate portion 40. Each one of the optical fibers 27 is for directing light from the light source 25 thus the line member 20 is illuminated.

In an alternate embodiment the light source 25 is optically coupled to the core portion 30.

In a further embodiment the core portion 30 is optically lossy such that refraction directs light from the light source 25 to the outer portion 50 through the intermediate portion 40 along a length of the line member 20.

In still a further embodiment, the system further comprises a plurality of optical fibers 27 positioned within the core portion 30. Each one of the optical fibers 27 is for directing light from the light source 25 thus the line member 20 is illuminated.

In even still a further embodiment, the system utilized a hollow line member with an illuminatable material positionable within an interior space defined by said hollow line member. The line member has first 21 and second ends 22 which are open to the interior space. Caps 23 are provided for selectively opening and closing the openings for facilitating insertion and removal of illuminating materials within the hollow line member.

In use, the illuminatable line may be coupled to a leader which in turn is coupled to the fly or tackle preferred by the user. The illumination source is preferably activated before casting the line, and the manner of activation varies by embodiment from injecting an activated chemiluminescent material through a aperture in the outer portion, to crushing the capsule positioned within the intermediate portion and combining the two inactive material forming a third active material, or simply switching on the illumination source.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An illuminatable fishing line system for use in conjunction with conventional fishing reels, rods and tackle, comprising:

a line member being elongate, said line member having a core portion providing tensile strength for said line member, said line member having an outer portion providing protection from abrasion and moisture for said line member;

said core portion having a substantially cylindrical central part, said central part, being elongate and extending a length of said line member, said core portion having a plurality of rib members extending radially from said central part, each one of said rib members couple said central part to said outer portion;

said line member having an intermediate portion positioned along a the length of said line member between said core portion and said outer portion, said intermediate portion facilitating illumination of said line member during night-time and low-light usage;

a light source abutting a first end of said line member, said light source providing illumination for said line member, said light source being optically coupled to said intermediate portion;

wherein said intermediate portion being optically lossy such that refraction directs light from said light source to said outer portion through said intermediate portion along the length of said line member;

wherein said optical lossy comprises a plurality of optical fibers positioned within said intermediate portion, each one of said optical fibers being for directing light from said light source whereby said line member is illuminated.

2. The system of claim 1, wherein said core portion being weighted such that said line member sinks at a predetermined sink rate.

3. The system of claim 2, wherein said predetermined sink rate is in the range between 1 inch per second and 10 inches per second inclusive.

4. The system of claim 1, wherein said core portion being adapted such that said line member floats upon a surface of water when cast.

5. The system of claim 1, wherein said light source being selected from a group of light sources consisting of an incandescent bulb, a light emitting diode, a laser, and a halogen bulb.

* * * * *